United States Patent Office 2,769,662
Patented Nov. 6, 1956

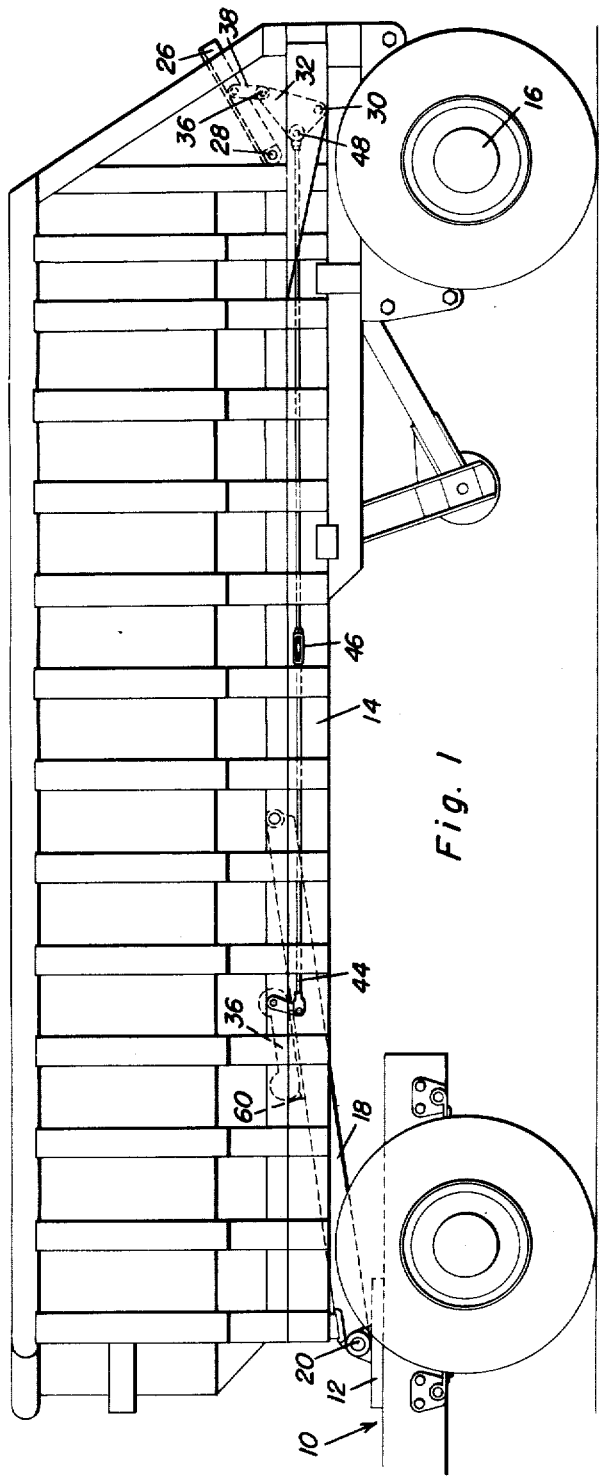

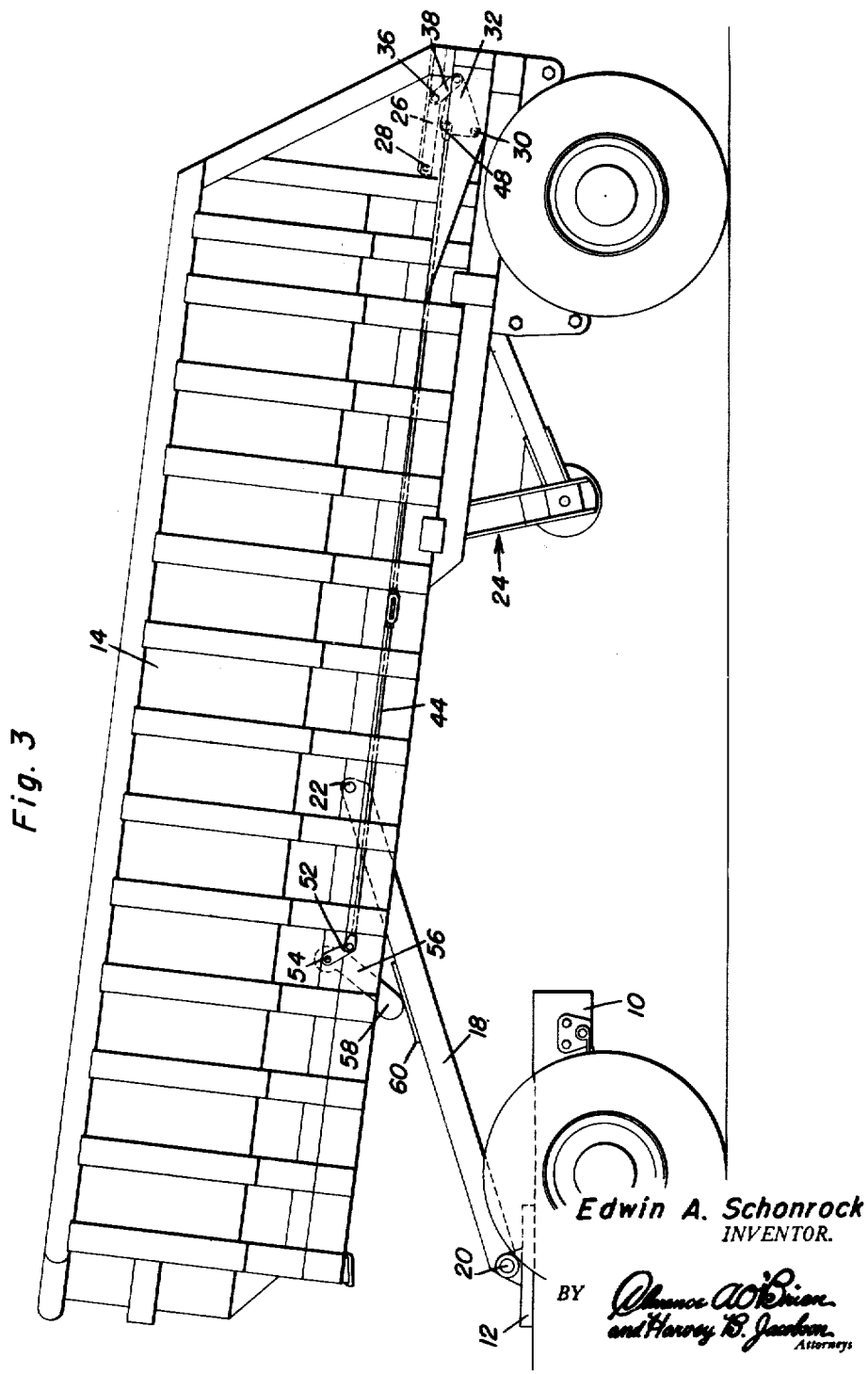

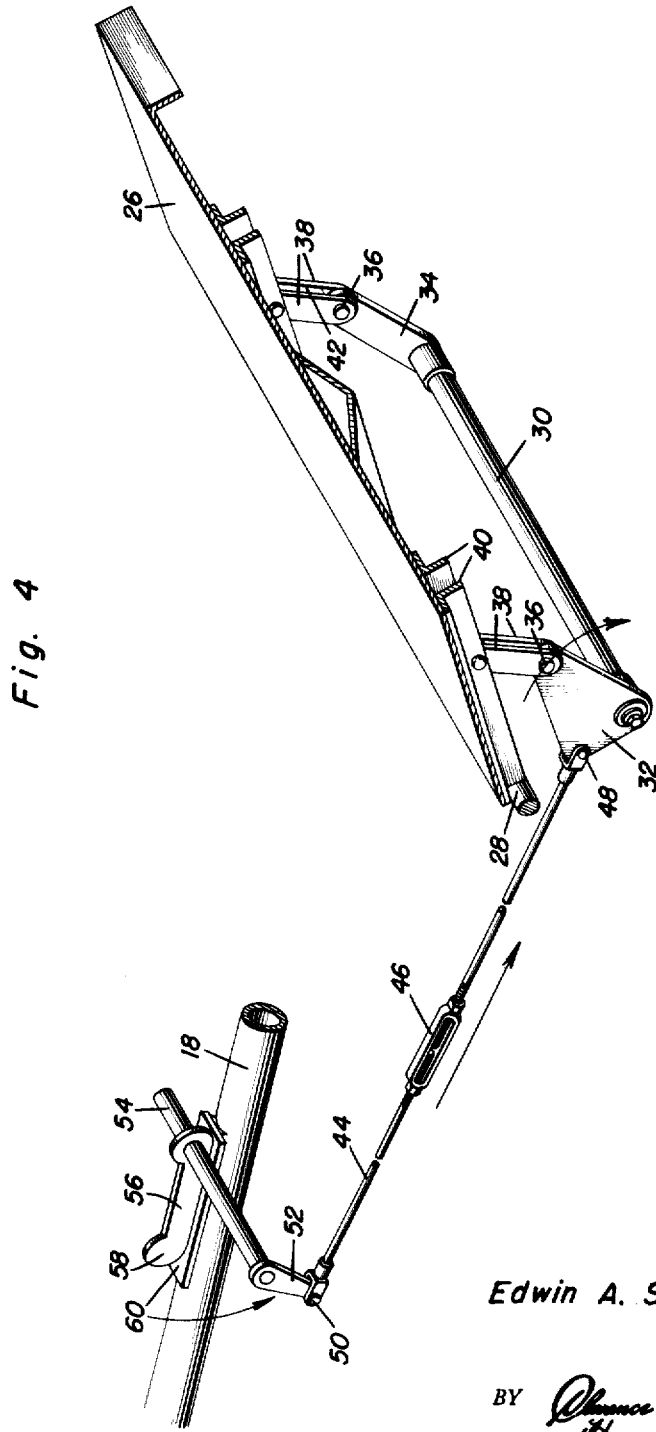

2,769,662

TAIL GATE AND OPERATING DEVICE FOR DUMP OR TRAILER TRUCKS

Edwin A. Schonrock, San Angelo, Tex.

Application August 21, 1952, Serial No. 305,573

10 Claims. (Cl. 298—23)

This invention comprises novel and useful improvements in a tail gate and operating device for dump or trailer trucks and more specifically pertains to an actuating mechanism for normally positively closing a tail gate of the dump body of a truck when the dump body is in its lowered position; and for automatically releasing the tail gate for opening movement when the dump body has been raised or tilted to a predetermined extent from its normally lowered position.

The primary object of this invention is to provide a tail gate operating mechanism for dump bodies for positively closing the tail gate in the lowered position of the body and for automatically releasing the tail gate to permit the same to open under the weight of the load carried by the body upon a predetermined tilting of the body towards its dumping position.

A further important object of this invention is to provide a tail gate operating mechanism specifically adapted for use with trailers which are vertically tilted about their rear axles for dumping their cargo, and wherein the tilting movement is effected by lift arms pivotally connecting the trailer bodies to a truck.

A further specific object of the invention is to provide a dumping trailer of a type wherein the wheel base between the rear axle of the trailer and the rear axle of the truck to which the trailer is connected is shortened to effect tilting and dumping movement of the trailer body, and wherein a tail gate operating mechanism is operatively associated with the tail gate and with the tilting movement of the trailer body for positively closing the tail gate in the lowered position of the trailer body and for releasing the tail gate for opening movement thereof upon a predetermined tilting or dumping movement of the trailer body.

Yet another important object of the invention is to provide an improved tail gate mechanism which shall be operable automatically in response to predetermined tilted positions of the trailer body for positively closing the tail gate or for releasing the same during the tilting and dumping movement of the trailer body.

And a final important specific object of the invention to be specifically enumerated herein, is to provide a tail gate operating mechanism for a trailer body of the tilting and dumping type which shall be entirely carried by the trailer body and shall be operable in response to predetermined tilting of the same.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is an elevational view showing one suitable form of dump trailer to which the principles of the present invention have been applied, the trailer body being shown in its lowered position and operatively connected to and supported by the fifth wheel assembly of a truck, a rear portion only of the latter being shown;

Figure 2 is a rear end view taken from the right of Figure 1 and showing the tail gate and part of its operating mechanism;

Figure 3 is a view similar to Figure 1 but showing the trailer dump body in its initial portion of its tilting or dumping position, the position of inclination of the trailer body being such that the tail gate operating mechanism has been actuated to release the tail gate which is shown in its open or dumping position therein; and, Figure 4 is a fragmentary perspective view of a tail gate and the associated tail gate mechanism, parts being broken away and omitted.

Referring now more specifically to the accompanying drawings, wherein like numerals designate like parts throughout the various views, it will be seen that the numeral 10 indicates a portion of a truck chassis having a conventional fifth wheel assembly 12 mounted thereon. At 14 is shown a trailer body which is adapted to be connected to the fifth wheel assembly of the truck as set forth hereinafter, and which is provided with a rear axle 16 by which the rear end of the trailer body is supported.

For simplicity of illustration a single rear axle 16 has been shown, although a pair of tandem axles may be employed as disclosed in detail and claimed specifically in my co-pending application, Serial No. 278,546, filed March 26, 1952, now Patent No. 2,661,236 for Winch and Spring Suspension Construction for Dump Trailer.

There is further illustrated in Figures 1 and 3 a pair of lift arms 18 which are pivoted as at 20 to the fifth wheel assembly 12 and as at 22 to any convenient portion of the frame of the trailer body 14. As set forth in my above identified co-pending application, as well as in my prior Patent Number 2,517,933 patented August 8, 1950, a winch and cable assembly are adapted to be connected to a winch carried by the fifth wheel assembly and to a pulley assembly indicated generally by the numeral 24 and mounted upon the framework of the trailer body for effecting a shortening of the wheel base of the trailer body to go with an upwardly tilting movement of the trailer body by virtue of the lift arms 18, as shown in Figure 3.

Since the details of the winch and cable system and the lift arms and fifth wheel assembly have been fully set forth and disclosed in my prior application, and form no part of the present invention other than the use of the lift arms 18 as set forth hereinafter, a further explanation and description of the same is believed to be unnecessary.

In the present invention however, I make use of a tail gate 26 which at its lower end is pivoted as by trunnions 28 to the associated frame work of the trailer at the rear end of the same whereby the tail gate is mounted for vertical pivoting about a horizontal pivot composed of the trunnions 28 and is movable between a lowered or dumping position, which is shown in Figure 3, and a lifted or closed position, which is shown in Figure 1. It should be here understood that it is proposed that in its closed position the tail gate shall extend rearwardly and upwardly from the bottom of the truck body, as shown in Figure 1, whereby the tail gate will serve to support a part of the load of the trailer body. When the tail gate is in its lowered position, however, it is intended that the same shall be substantially flush with and form a continuation of the bottom of the truck body whereby the contents of the body can be readily dumped or discharged from the same as the trailer body is lifted into a tilted or dumped position.

The present invention comprises a mechanism whereby the tail gate is automatically and positively moved into its raised or closed position when the trailer body is disposed below a predetermined tilted position corresponding to that shown in Figure 3, and whereby the operating mechanism will release the tail gate and permit the latter to move to its open position whenever the trailer body has been raised above the aforesaid predetermined tilted position. The weight of the inclined tail gate and of the portion of the load resting thereon continuously urges the tail gate by gravity towards its lowered and dumping position shown in Figure 3. However, an operating mechanism is provided which prevents lowering of the tail gate until after the tilting dump body has moved into the position of Figure 3, upon which the tail gate is free to open under the influence of gravity. The operating mechanism positively closes the tail gate when the tilting moves below the angle of tilting of Figure 3 into the load carrying position of Figure 1.

This operating mechanism is shown more clearly in Figure 4. As will be seen in that figure, there is provided an axle or crank shaft 30 which is adapted to be suitably journaled upon the frame of the trailer body as indicated in Figures 1–3. Mounted upon the crank shaft 30 is an actuating member in the form of a bell crank 32 which may consist of a triangular shaped plate or a member of any other configuration and which comprises a lever or crank arm upon the crank shaft 30. In the embodiment illustrated, the bell crank member 32 is secured at one of its apices to the crank shaft 30 for rigid movement therewith, whereby oscillatory movement of the member 32 will cause an oscillation of the crank shaft 30. If desired, one or more crank arms 34 may likewise be rigidly secured to the crank shaft 30 and each of these crank arms 34, if such were provided, and one apex of the bell crank member 32 are connected by pivot ends 36 and connecting links 38 to reinforcing or brace members 40 secured to the tail gate 26. The members 40 as shown, may conveniently comprise angle irons which are welded or otherwise secured to the tail gate. A bracing link or block 42 may be provided between the links 38 for stiffening and strengthening the same where desired.

As so far described, it will be understood that upon oscillation of the plate 32, the crank shaft 30 will also be rocked or oscillated, and through the links 38 will cause a pivoting movement of the tail gate between its lowered or raised positions.

In order to effect and control the rocking of the shaft 30 and consequently, raising and lowering of the tail gate, a connecting link or rod 44 is provided which may consist of two sections having a turnbuckle 46 therebetween whereby the length of the rod may be adjusted. The ends of the rod are pivoted as at 48 and 50, by means of clevises or the like, to the other apex of the bell crank member 32, and to a crank arm 52 carried by a rocker shaft 54 which is suitably journaled upon the frame of the trailer body in a position above and extending across the lift arms 18.

Fixedly secured to the rocker shaft 54 is a lever or oscillating actuator 56 which has a rounded cam-nose 58 thereon. The member 56 overlies one of the lift arms 18 and is adapted to rub against an actuator plate 60 which is welded or otherwise rigidly secured to the upper surface of the lift arm 18.

The position of the parts is such that as the trailer body is lowered from its dumping position towards its normal load-carrying position, as shown in Figure 1, the downward tilting movement of the trailer body and the downward tilting movement of the lift arms 18 will cause the body to more closely approach the arms until cam-nose 58 engages the plate 60 in the position shown in Figure 3. Further downward movement of the arms and body from the position shown in Figure 3 will cause a tilting movement of the oscillating actuator 56 and consequently an oscillatory movement of the rocker shaft 54, which in turn, through the connecting linkage, will raise the tail gate from its lowered to its upper or closed position. Obviously, upon raising or tilting of the truck body, the reverse operation will occur and the operating mechanism will release the tail gate and permit the latter to open under the weight of the load carried by the body.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A truck trailer having a dump body, means for tilting said body into dumping position, a tail gate hinged to the rear end of said body and movable between an upwardly and rearwardly inclined load supporting closed position and a lowered dumping position, means actuated by said tilting means for positively moving said tailgate into closed position when said dump body has moved to a predetermined lowered position, said last means comprising a bell crank pivoted to said dump body intermediate its ends, means connecting one end of said bell crank to said tail gate and means connecting the other end of said bell crank to said tilting means, said tilting means including a lift arm pivotally connected to said dump body.

2. A dump trailer comprising a tilting body adapted to be drawn by a tractor truck, a lift arm of a constant length pivoted to said body and adapted for connection at its other end to said tractor truck, a tail gate hinged to the rear of the body for vertical pivoting movement between a lowered and open dumping position and a raised upwardly and rearwardly inclined load supporting closed position, said tail gate being mounted for movement by gravity to its lowered position, means for moving said tail gate to said inclined load supporting closed position responsive to pivoting movements of said lift arm during movement of said tilting body to lowered position.

3. The combination of claim 2 wherein said tail gate is hinged for vertical swinging movement about a horizontal axis adjacent its lower end.

4. A dump trailer comprising a tilting body, a lift arm pivoted to said body for connecting the latter to a truck, a tail gate hinged to the rear of the body for vertical pivoting movement between a lowered and open dumping position and a raised upwardly and rearwardly inclined load supporting closed position, means operable in response to predetermined pivoting movements of said lift arm for positively moving said tail gate into closed position and for releasing said tail gate for opening movement, said last means comprising an actuating plate on said lift arm, a movable actuator mounted on said body and actuated by said plate, connecting means engaging said actuator and said tail gate.

5. A dump trailer comprising a tilting body, a lift arm pivoted to said body for connecting the latter to a truck, a tail gate hinged to the rear of the body for vertical pivoting movement between a lowered and open dumping position and a raised upwardly and rearwardly inclined load supporting closed position, means operable in response to predetermined pivoting movements of said lift arm for positively moving said tail gate into closed position and for releasing said tail gate for opening movement, said last means comprising an actuating plate on said lift arm, a movable actuator mounted on said body and actuated by said plate, connecting means engaging said actuator and said tail gate, said connecting means including a member pivoted to said body, a rod connected to said member and to said actuator, means operatively connecting said member to said tail gate.

6. In a truck and trailer combination of the type including a truck having a fifth wheel and a trailer with lift arms of a constant length pivoted to said fifth wheel and to said trailer and means causing movement of said trailer towards said truck whereby said lift arms will cause vertical pivoting of said trailer about its rear axle to effect dumping of said trailer, and said trailer having a tail gate at its rear end mounted for vertical pivoting movement between dumping and closed positions, the improvement comprising; mechanism for positively positioning and maintaining said tail gate in one of said positions and for releasing and positively moving said tail gate from said last mentioned position, actuating means for said mechanism operatively engaging said lift arms and operable in response to predetermined movement of said lift arms.

7. In a truck and trailer combination of the type including a truck having a fifth wheel and a trailer with lift arms of a constant length pivoted to said fifth wheel and to said trailer and means causing movement of said trailer towards said truck whereby said lift arms will cause vertical pivoting of said trailer about its rear axle to effect dumping of said trailer, and said trailer having a tail gate at its rear end mounted for vertical pivoting movement between dumping and closed positions, the improvement comprising; mechanism for positively positioning and maintaining said tail gate in one of said positions and for releasing said tail gate from said last mentioned position, actuating means for said mechanism operatively engaging said lift arms and operable in response to predetermined movement of said lift arms, said actuating means including a lever pivoted upon said trailer and means operatively connecting said lever to said lift arms.

8. In a truck and trailer combination of the type including a truck having a fifth wheel and a trailer with lift arms of a constant length pivoted to said fifth wheel and to said trailer and means causing movement of said trailer towards said truck thereby elevating said lift arms and causing vertical pivoting of said trailer about its rear axle to effect dumping of said trailer, and said trailer having a tail gate at its rear end mounted for vertical pivoting movement between dumping and closed positions, the improvement comprising; mechanism for positively positioning and maintaining said tail gate in a raised upwardly and rearwardly inclined load supporting position and for releasing said tail gate from said last mentioned position, means for actuating said mechanism and operable in response to predetermined movement of said lift arms, said actuating mechanism including a lever pivoted upon said trailer and means operatively connecting said lever to said lift arms, said last mentioned means comprising an abutment member on one of said lift arms, said lever being engageable with said abutment member when the latter is in a predetermined pivoted position.

9. In combination, a truck, a trailer, lift arms pivoted to said truck and trailer, means causing vertical pivoting of said lift arms and trailer for moving the latter into a sharply inclined dumping position from a substantially horizontal load carrying position, a tail gate hinged to said body for vertical swinging movement between closed and opened positions, means operated by said lift arms to positively actuate said tail gate to closed position when said body has moved substantially into load carrying position, said tail gate actuating means comprising a crankshaft journaled on said body, a bellcrank on said crankshaft, means connecting said bellcrank to said tail gate and further means operatively connecting said bellcrank to said lift arms.

10. In combination, a truck, a trailer, lift arms pivoted to said truck and trailer, means causing vertical pivoting of said lift arms and trailer for moving the latter into a sharply inclined dumping position from a substantially horizontal load carrying position, a tail gate hinged to said body for vertical swinging movement between closed and opened positions, means operated by said lift arms to positively actuate said tail gate to closed position when said body has moved substantially into load carrying position, said tail gate being hinged for vertical swinging movement about an axis adjacent its lower end and is movable between an upwardly inclined, load supporting closed position and a lowered, dumping opened position, said tail gate actuating means comprising a crankshaft journaled on said body, a bellcrank on said crankshaft, means connecting said bellcrank to said tail gate and further means operatively connecting said bellcrank to said lift arms.

References Cited in the file of this patent

UNITED STATES PATENTS

| | | |
|---|---|---|
| 1,373,000 | Gilbert et al. | Mar. 29, 1921 |
| 1,394,521 | Akers | Oct. 25, 1921 |
| 1,749,530 | Flowers | Mar. 4, 1930 |
| 2,148,798 | Barrett | Feb. 28, 1939 |
| 2,219,256 | Evangelista | Oct. 22, 1940 |
| 2,605,134 | Clement et al. | July 29, 1952 |